June 19, 1951        E. B. HAMMOND, JR        2,557,103
TARGET COURSE GYROSCOPE SIGHT
Filed Oct. 20, 1944
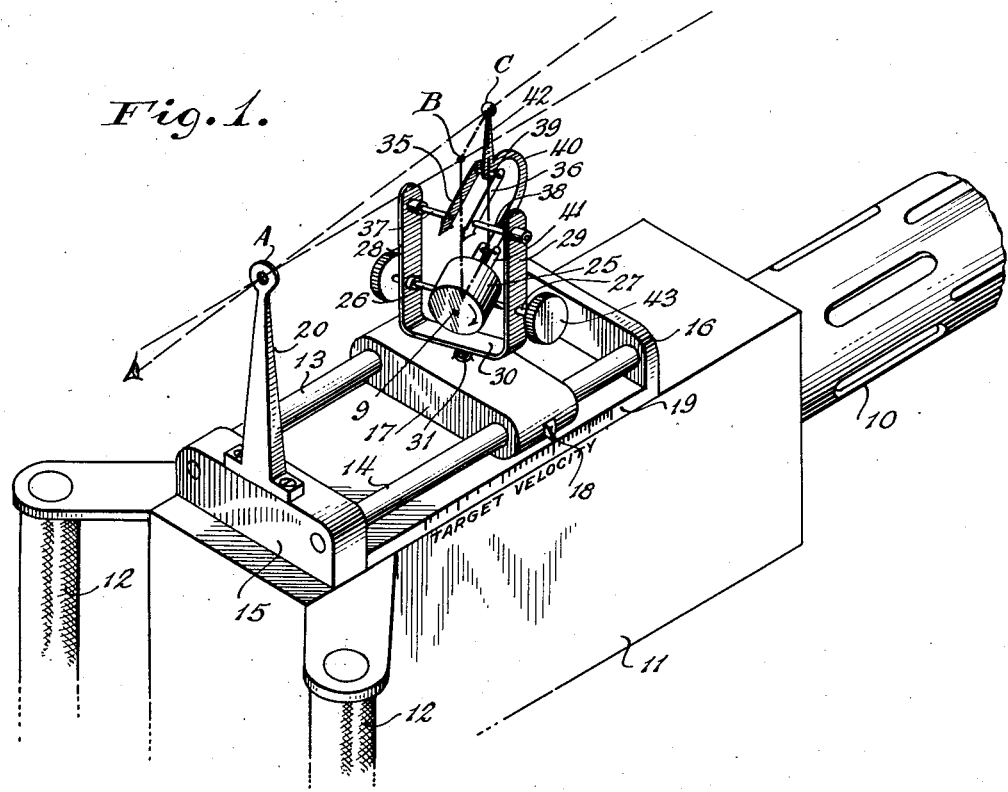
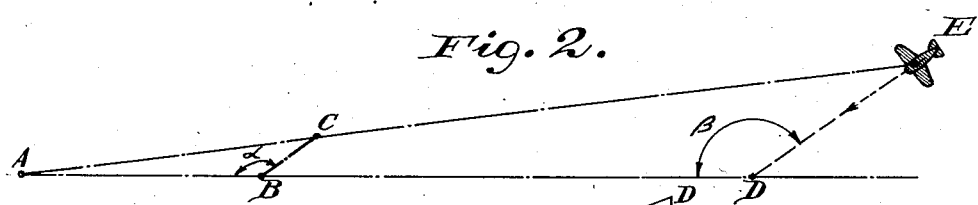
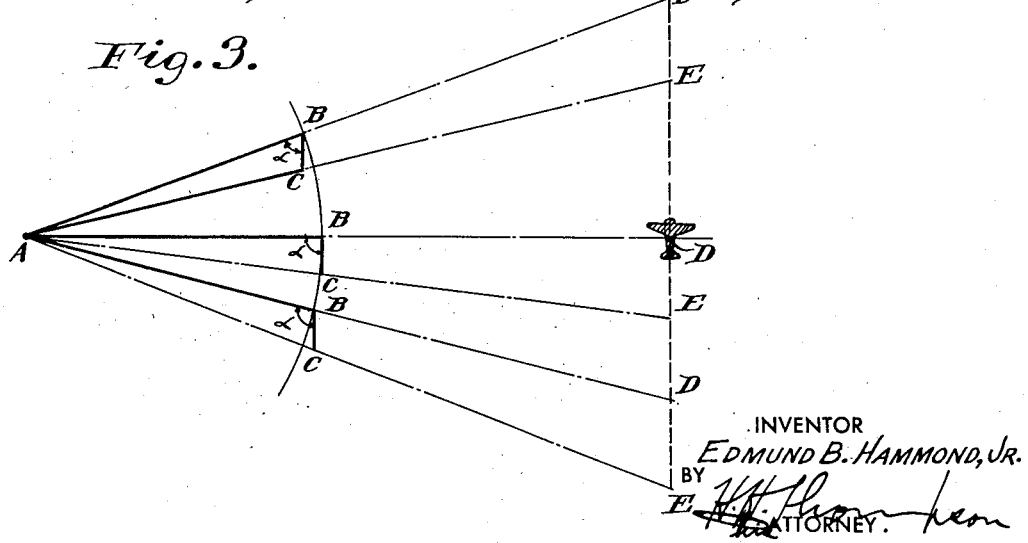
INVENTOR
EDMUND B. HAMMOND, JR.
BY
ATTORNEY.

Patented June 19, 1951

2,557,103

UNITED STATES PATENT OFFICE 2,557,103

TARGET COURSE GYROSCOPE SIGHT

Edmund B. Hammond, Jr., Floral Park, N. Y., assignor to The Sperry Corporation, a corporation of Delaware Application October 20, 1944, Serial No. 559,625

6 Claims. (Cl. 33—49)

This invention relates to a computing gun sight and more particularly to a gun sight in which a gyroscope is used to solve for the prediction angle.

An object of the invention is the provision of a simplified computing sight in which a free gyroscope is positioned parallel to the target course at the outset of a target tracking operation, the gyroscope being effective as the tracking of a target progresses to constantly position a sight member according to the required lead angles.

The invention will now be described with the aid of the accompanying drawings, of which Fig. 1 is a schematic view of the sight;

Figs. 2 and 3 are diagrams illustrating the operation of the sight.

Referring to the drawings, Fig. 1 shows a simplified embodiment of a sight according to the present invention in which a gun having a receiver 11 and handgrips 12 is shown with a pair of spaced rods 13 and 14 mounted in supports 15 and 16 disposed on the upper surface of the receiver. A sliding member 17 mounted on rods 13 and 14 carries an index 18 adapted to be positioned with reference to a scale 19 which is fixed with respect to the gun. A rear sight 20 is supported by member 15. This sight is shown as a fixed sight in the drawings, but if required, any suitable adjustable sight could be used.

A gyroscope 25 is supported for movement about an axis defined by aligned shafts 26 and 27 secured to opposite sides of its casing. The shafts are free to turn in bearings in arms 28 and 29 of a U-shaped member 30 mounted on a shaft 31 which is free to rotate in a bearing in the upper surface of sliding member 17. The arrangement just described permits free movement of the gyroscope about two intersecting axes.

The U-shaped member 30 supports a sighting device so coupled with the gyroscope as to be constantly parallel to the spin axis 9 thereof.

The sighting device in the form shown in Fig. 1 is suitable for use at short and intermediate ranges. It comprises a pair of members 35 and 36 formed for convenience to the approximate shape of arrows. These members are secured respectively to shafts 37 and 38 supported in suitable bearings in the arms of the U-shaped member 30. The members 35 and 36 are connected by a rod 39 offset from shafts 37 and 38 which maintains the members in spaced parallel relationship. A link 40 connecting pivot 41 on the gyroscope casing aligned with the spin axis of the gyroscope and rod 39 is of such length as to maintain arrows 35 and 36 parallel with the spin axis. In the present embodiment of the invention a front sight member 42 is shown fixed to link 40. This sight member may be of any convenient type. Knobs 43 for manually positioning the gyroscope are attached to shafts 26 and 27.

The particular embodiment of the sight just described is adapted for use against rapidly moving targets such as aircraft, P. T. boats and the like, where the great speed of the targets makes it desirable to have some quickly available means for providing a reliable measure of the prediction angle.

In operation the gun is directed toward the target and the gyroscope spin axis is positioned parallel to the target course by means of either knob 43. Arrows 35 and 36 serve as a guide for thus positioning the gyroscope, the arrows pointing in the direction in which the target is moving and being positioned parallel to the target course. Preferably, the target should be observed as flying between the two arrows in a course parallel therewith, and thereafter the target is tracked using the front sight 42 and the rear sight 20 in the usual manner. As long as the target course does not change, the gyroscope when once set will remain parallel to the target course during the short time the target is being tracked.

The sight solves for the prediction angle by solving a prediction triangle, one side of which is the line of the gun bore, or a line parallel thereto, another side is the line of sight to the target, and the third side is the path travelled by the target during the time-of-flight of the bullet. The target path is assumed to be a straight line.

In the present embodiment of the invention, the intersection of the gyroscope axes is a point movable along a path parallel with the gun barrel and this point is indicated by the reference character B in the various illustrations.

Referring to Fig. 2. Assuming that line DE is the path of the target which moves from E to D during the time-of-flight of the bullet, and point A of the triangle ADE is at the rear sighting element 20 of the gun, then line AE, the line of sight to the target, is equal to present range, and line AD, the line of the gun bore, is equal to future range. The point B lies on line AD and the point C which is the front sighting element 42 must always lie on line AE, and since BC has been positioned parallel to DE, we have two similar triangles, the larger out in space and the smaller disposed within the sighting arrangement. Since angle $\alpha$ is always equal to angle $\beta$, by suitably proportioning the distance BC and also AB, the angle at A of the triangle, which is the prediction angle, can be determined automatically by the sight.

The distance AB is adjustable with reference to scale 19, the scale being calibrated in terms of target velocity and so laid out that when index 18 is positioned according to estimated target velocity the length of AB is proportional to the reciprocal of estimated target velocity. The distance BC is constant and is stabilized in space by the gyroscope. The length of AC is not measured by the sight in any way. Instead, the angle ABC is maintained at the proper value by the target course gyroscope while the target is being tracked by the gunner. Since the line BC is stabilized by a free gyroscope, the sight would give the proper prediction angle irrespective of angular motion of the supporting gun platform provided that the gunner is able to track properly.

It can be seen from the drawings that a small scale prediction triangle ABC is constructed within the sight itself. The length of the side AB of this triangle as described above is proportional to the reciprocal of target velocity. The length of the side AC is proportional to the ratio of present range to the product of future range and target velocity. The length of the third side BC is proportional to the ratio of the product of target velocity and time-of-flight to the product of future range and target velocity. This is simply the ratio of time-of-flight of the bullet to future range and is assumed to be a constant for short range use.

It will be understood from the drawings, that since BC is parallel to DE, $$\triangle ABC \sim \triangle ADE$$

$$\overline{DE} = V_t \times T_f$$

$$\overline{AB} \sim \frac{\overline{AD}}{AD \times V_t} = \frac{1}{V_t}$$

$$\overline{BC} \sim \frac{\overline{DE}}{AD \times V_t} = \frac{T_f}{AD} = \frac{1}{\text{average bullet velocity}} \sim \text{constant}$$

where $V_t$ represents relative target velocity and $T_f$, time-of-flight.

The manner in which angle $a$ and the prediction angle A varies for different angular positions of the target is shown in Fig. 3. The point B describes an arc with A as a center. BC is kept parallel to the target path ED by the gyroscope. Then as the target is tracked, angle $a$ changes and the front sight C is continuously offset from the gun line ABD according to the lead angle A due to the changing relative positions of the spin axis of the gyroscope and the line of the gun.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a gun sight for short range use, means for solving for lead angles on the basis of two superimposed similar triangles, comprising a rear sight member defining a common apex for both triangles, the gun line defining the direction of corresponding sides, the direction of the base line of one triangle being defined in space by the target path, a front sight, pivot means disposed along the gun line, a member attached to the pivot means for supporting the front sight in predetermined spaced relation therewith, the distance between the sight and the axis of the pivot means being the base of the other triangle, the front sight cooperating with the rear sight to define a line of sight to the target thus defining the direction of the remaining sides of both triangles, gyroscope means mounted on the last named member effective to stabilize the sight in space and maintain the associated triangle base parallel to the target path during tracking, the proportion of the last mentioned base line to the distance between the rear sight member and pivot means being such that the common apex angle of the triangles is constantly equal to the required lead angle in any given tracking position.

2. A gun sight according to claim 1 in which the distance between the rear sight member and the pivot point for the front sight is adjustable with reference to a target velocity scale.

3. A gun sight according to claim 1 in which the length of the base of one triangle is proportional to the product of target velocity and time-of-flight, and the length of the base of the other triangle is proportional to the ratio of time-of-flight to future range.

4. A lead angle computing arrangement for a target tracking device comprising a free gyroscope having its spin axis positioned parallel to the target path, means for moving the gyroscope with the tracking device as the latter tracks a target, and a line of sight defining device displaced according to a lead angle by the resulting relative displacement of the tracking device and gyroscope, the line of sight defining device comprising a first sighting element supported by the tracking device and a second sighting element supported by the gyroscope.

5. In a gun sight for directing gun fire at a moving target, means for solving lead angles on the basis of two superimposed similar triangles comprising a rear sight defining a common apex for both triangles, the gun line defining the direction of corresponding sides, the direction of the base line of a larger one of the triangles being defined in space by the target path, a front sight cooperating with the rear sight for defining a line of sight to the target and the direction of the other corresponding sides of the triangles, pivot means disposed along the gun line, a member attached to the pivot means for supporting the front sight in predetermined spaced relation therewith, the distance between the front sight and the axis of said pivot means being the base of a smaller one of the triangles, a free gyroscope supported on the pivot means having its spin axis in fixed alignment with the last mentioned base for maintaining said base parallel to that defined by the line of flight of the target while a target is being tracked, the distance at which the front sight is spaced from the axis of said pivot means being proportional to the ratio of time-of-flight to future range and the distance between the rear sight and the pivot means being proportional to a target velocity value, the relative movement of the gyroscope and gun during tracking maintaining the apex angle at the required lead angle value.

6. In a gun sight for directing gun fire at a moving target, means for solving lead angles on the basis of two superimposed similar triangles comprising a rear sight defining a common apex for both triangles, the gun line defining the direction of corresponding sides, the direction of the base line of a larger one of the triangles being defined in space by the target path, a front sight cooperating with the rear sight for defining a line of sight to the target and the direction of the other superimposed corresponding sides of the triangles, pivot means disposed along the gun line, a member attached to the pivot means for supporting the front sight in predetermined spaced relation therewith, the distance between the front sight and the axis of said pivot means being the base of the smaller one of the triangles, a free gyroscope supported on the pivot means having its spin axis in fixed alignment with the last mentioned base, manually operable means for positioning the spin axis as well as said last named base parallel to that defined by the line of flight of the target, the proportion of the distance between the front sight and the axis of said pivot means to that between the rear sight and pivot means being such that the common apex angle of the triangles is equal to the required lead angle for any given tracking position.

EDMUND B. HAMMOND, Jr.

REFERENCES CITED

The following references are of record in the file of this patent:

UNITED STATES PATENTS

| Number | Name | Date |
|---|---|---|
| 1,031,769 | Barr et al. | July 9, 1912 |
| 1,650,628 | Inglis | Nov. 29, 1927 |
| 1,651,093 | Le Prieur | Nov. 29, 1927 |
| 1,936,442 | Willard | Nov. 21, 1933 |
| 2,404,379 | James | July 23, 1946 |
| 2,407,191 | Tear et al. | Sept. 3, 1946 |
| 2,423,831 | Garbarini et al. | July 15, 1947 |
| 2,437,463 | Ford | Mar. 9, 1948 |
| 2,441,147 | Haubroe | May 11, 1948 |
| 2,464,195 | Burley et al. | Mar. 8, 1949 |
| 2,467,831 | Johnson | Apr. 19, 1949 |
| 2,471,278 | Meacham | May 24, 1949 |